Aug. 3, 1965  E. A. KELSO  3,198,846
COMBINATION HYDRODEALKYLATION AND DESULFURIZATION PROCESS
Filed June 8, 1961

INVENTOR.
EDWARD A. KELSO,
BY
ATTORNEY.

United States Patent Office 3,198,846
Patented Aug. 3, 1965

3,198,846
COMBINATION HYDRODEALKYLATION AND
DESULFURIZATION PROCESS
Edward A. Kelso, Baytown, Tex., assignor, by mesne assignments, to Esso Research and Engineering Company, Elizabeth, N.J., a corporation of Delaware
Filed June 8, 1961, Ser. No. 115,699
1 Claim. (Cl. 260—672)

The present invention deals with the production of naphthalene from alkylated naphthalene hydrocarbon-containing feed stocks by thermal non-catalytic hydrodealkylation. The present invention more particularly deals with a method for producing substantially benzothiophene-free naphthalene from an alkyl naphthalene feed stock by a combination of hydrodesulfurization and thermal hydrodealkylation. In its most specific aspects, the present invention deals with a method for hydrodesulfurizing a hydrocarbon feed stock for the hydrodealkylation process, or a hydrodesulfurization treatment for the hydrodealkylation effluent.

In the production of naphthalene from hydrocarbon streams which contain alkyl-substituted naphthalene hydrocarbons, by a thermal non-catalytic hydrodealkylation operation, it has been found that the naphthalene product has been contaminated to a certain extent by the presence of benzothiophene (thionaphthene) which has substantially the same boiling point as naphthalene. This close identity of boiling points renders it uneconomical to separate and purify the naphthalene by conventional distillation operations, since the number of contacting plates required would be inordinately large. The benzothiophene which is present in the naphthalene product is formed during the hydrodealkylation reaction by hydrodealkylation of alkylated benzothiophenes and from the thermal degradation and/or ring closure of other sulfur-containing organic compounds, the sulfur being present predominately in the form of "ring sulfur" with smaller amounts as "aliphatic sulfur." Surprisingly, it has been found that sulfur in the form of hydrogen sulfide will not interact to a large extent with the aromatic hydrocarbons during the hydrodealkylation operation, even though extremely high temperatures and pressures are involved.

The present invention has several aspects. In the first aspect, the present invention prevents the formation of benzothiophene by a removal of the offending sulfur compounds in a preliminary catalytic hydrodesulfurization reactor. The hydrodesulfurization reaction is an integral part of the hydrodealkylation reaction in that the total effluent from the hydrodesulfurization reactor is passed directly into the hydrodealkylation reactor, with the only operation which is required being the addition of sufficient heat to raise the temperature of the effluent to the minimum hydrodealkylation temperature. The hydrogen-to-hydrocarbon ratio and the pressure in the hydrodesulfurization reactor are chosen to be substantially identical with that required for the hydrodealkylation reaction. If desired, a part of the hydrogen required in the hydrodealkylation reaction can be bypassed around the desulfurization zone. The pressure in the hydrodesulfurization reactor is maintained only sufficiently higher than that in the hydrodealkylation reactor to accomplish the conveyance of the effluent from the hydrodesulfurization reactor into the hydrodealkylation zone. This difference in pressure will, of course, be equal to the pressure drop through the transfer lines and the heater.

In a second aspect, the present invention deals with the removal of benzothiophenes from the hydrodealkylation reactor after formation by a hydrodesulfurization operation which is maintained at relatively mild conditions in order to remove the benzothiophene while yet converting only a minor portion of the naphthalene product into tetralin and/or decalin. The benzothiophene is converted to ethyl benzene and hydrogen sulfide, which may be separated from the naphthalene product by distillation. The total product from the hydrodealkylation reactor is charged, with added hydrogen if desired, into the hydrodesulfurization reactor without separation and after an initial cooling to produce a charge stock of the desired hydrodesulfurization temperature.

In its final aspect, the present invention deals with a combination of the previously stated operations; that is, the combination of a pretreatment of the feed stock to the hydrodealkylation reactor and an aftertreatment to remove such benzothiophene as may have resulted during the hydrodealkylation reaction. Although the coaction of the two treatments may not be required, under conditions where rigorous specifications must be met, the use of both pre- and aftertreatment may be desirable. It is also possible in the combination unit to select either the pretreatment or the aftertreatment for optimum economic operation, as is desired.

Suitable feed stocks for use in the production of naphthalene by hydrodealkylation are obtained from virgin middle distillate fractions, cycle stocks from catalytic cracking, and aromatic concentrates such as extracts from the above stocks. Feed stocks obtained from these sources are generally high in sulfur content to an undesirable extent. The sulfur impurity in the feed stock is reflected in the presence of benzothiophene as a contaminant in the final naphthalene product.

The practice of the present invention may be more completely understood by reference to the drawings in which.

Figure 1:
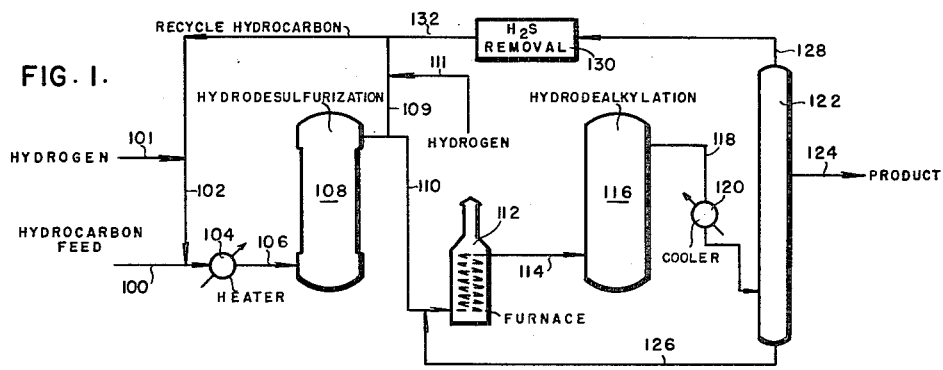
FIG. 1 is a schematic representation of the practice of the first aspect of the invention, wherein the hydrodesulfurization of the feed stock is utilized preceding the hydrodealkylation reaction.

Considering in detail FIG. 1, the hydrocarbon feed is introduced by way of a line 100 and admixed with hydrogen introduced by a way of lines 101 and 102. The admixture of the alkylated naphthalene-containing hydrocarbon stream and the gaseous hydrogen is heated in heater 104 which may suitably be a fired furnace, or, if desired for heat economy, the feed may be partially or totally heated by exchange in a heat exchanger, not shown, with the higher temperature dealkylation product. The heated effluent is passed at hydrodesulfurization temperature by way of line 106 into the hydrodesulfurization reactor 108. The hydrodesulfurization reactor contains a bed of catalyst which is chosen from the metals of Group VI and/or of Group VIII of the Periodic Table and their compounds. Representative of the metals of Group VIII are platinum, palladium, nickel, cobalt, etc. Compounds of Group VI are metals such as molybdenum and tungsten and their compounds. The catalyst may be supported on alumina, silica, silica-stabilized alumina, or activated carbon. It should be understood that combinations of the metals of Groups VI and VIII and their compounds may be utilized as the hydrodesulfurization catalyst, as is well-known in the art. The heated hydrocarbon and hydrogen are introduced into the reactor 108 at a temperature of between 600° F. and 1000° F., and are passed through the reactor to be removed by way of line 110. Additional recycle hydrogen may be added through line 109 or fresh makeup hydrogen may be added through line 111. The effluent from reactor 108 is then passed directly into a heater 112 and from thence by way of line 114 into the hydrodealkylation reactor 116. No separation of products occurs between the two reactors, the total effluent of the hydrodesulfurization reactor being charged into the hydrodealkylation zone. In the hydrodealkylation zone, the heated effluent from the hydrodesulfurizer at about 1000° F. to 1100° F. is allowed to rise in temperature spontaneously as a result of the exothermic nature of the reactions to a temperature of about 1300° F. and is passed through the hydrodealkylation zone in a time period between 2 and 120 seconds. The effluent from the hydrodealkylation reactor is removed by way of line 118 and passed through a feed product heat exchanger (not shown) and/or through cooler 120 into a fractionating tower 122. In the fractionation tower, a product side stream is removed which comprises naphthalene, uncontaminated with benzothiophene, and a bottom stream, which comprises the unreacted or partially reacted alkylated naphthalene precursors, is withdrawn by way of line 126 and is charged into the furnace 112 along the effluent from the hydrodesulfurization reactor. If desired, a fractionator bottoms product comprising heavy polymer may be withdrawn and a recycle stream of less fouling tendency withdrawn as a lower vapor sidestream. The overhead stream is removed by line 128 and treated for hydrogen sulfide removal at 130. Depending upon hydrogen availability and the hydrogen purity desired, a hydrogen purification step such as absorption or sieve separation may be employed on the recycle hydrogen stream. The purified hydrogen-rich stream is passed by way of line 132 and is admixed with the hydrocarbon feed from line 100. Part of the purified hydrogen recycle stream may be added to the dealkylation charge through line 109. Fresh hydrogen make-up sufficient to maintain the desired hydrogen-to-hydrocarbon ratio is introduced as aforesaid through lines 101 and/or line 111. It is thus apparent that a simplified method of producing naphthalene has been provided by the present inventor wherein the expensive treatment of a desulfurized feed has been avoided, and a highly efficient system involving a unitary hydrodesulfurization and hydrodealkylation reaction has been provided. By the practice of the present invention, a naphthalene product is obtained which is substantially free of sulfur, containing less than one one-hundredth weight percent thereof.

During the hydrodesulfurization operation in the presence of the catalyst as set forth above, the temperature is maintained within a range of 600° F. to 950° F., at a pressure of 500 to 1500 p.s.i.g. The hydrogen-to-hydrocarbon ratio is maintained within the range of 0.6 to 12 mols of hydrogen per mol of liquid hydrocarbon (500 to 10,000 s.c.f./bbl. of liquid feed), while the space velocity within the hydrodesulfurization reactor is maintained within the range of 0.5 to 10 volumes per volume per hour. The hydrogen purity within the hydrodesulfurization reactor is maintained at about 50% to 100% hydrogen, and the percentages adjusted by the introduction of fresh hydrogen into the system. The hydrogen-rich recycle stream will be bled continuously or intermittently by means not shown, to avoid a gradual degradation of the hydrogen purity resulting from a buildup of light hydrocarbons (methane, ethane, etc.) or the bleed of light hydrocarbons may be taken through a liquid absorption or sieve separation step.

In the hydrodealkylation reactor the operating conditions are maintained at a pressure sufficiently lower than that utilized in the hydrodesulfurization reactor to obviate the need for pumping means to transport the effluent from the hydrodesulfurization step into the hydrodealkylation zone. This pressure will range between 500 and 1500 p.s.i.g. The hydrogen-to-hydrocarbon ratio will be maintained at 3 to 15 mols of $H_2$ per mol of hydrocarbon. Additional hydrogen may be injected ahead of the dealkylation zone if required. At high hydrogen rates initially, the hydrogen-to-hydrocarbon ratio will be almost as great as that which obtains in the hydrodesulfurization reactor, since there is a relatively small consumption of hydrogen in the hydrodesulfurization zone. The temperature within the hydrodealkylation reactor is maintained at an optimum of between 1000° F. and 1600° F., depending upon the degree of conversion which is desired.

As exemplary of the efficacy of the hydrodesulfurization unit, the results of several runs are tabulated below.

TABLE I

*Feed stock desulfurization*

Conditions:
500 s.c.f. $H_2$/bbl. 1 v./v./hr. feed rate.
Catalyst: Cobalt molybdate on alumina.

| Temp., °F | 800 | 750 | 700 | 750 | 750 | Feed |
|---|---|---|---|---|---|---|
| Pressure, p.s.i.g | 200 | 200 | 200 | 100 | 500 | |
| Analysis: LVMS | Volume Percent | | | | | |
| Compound types by Carbon-Hydrogen Ratio: | | | | | | |
| Alkyl benzenes $C_nH_{2n}-6$ | 8.8 | 8.3 | 7.2 | 9.1 | 6.7 | 7.7 |
| Alkyl tetralins-indanes $C_nH_{2n}-8$ | 10.0 | 10.1 | 11.4 | 9.0 | 29.5 | 6.1 |
| Indenes $C_nH_{2n}-10$ | 4.1 | 4.8 | 4.6 | 4.2 | 6.4 | 4.9 |
| Naphthalenes | 42.9 | 39.3 | 39.8 | 40.3 | 31.8 | 43.2 |
| Acenaphthenes $C_nH_{2n}-14$ | 12.0 | 12.6 | 13.1 | 12.8 | 11.4 | 11.6 |
| Acenaphthylenes $C_nH_{2n}-16$ | 2.4 | 1.9 | 1.8 | 2.0 | 1.4 | 1.1 |
| Phenanthrenes $C_nH_{2n}-18$ | 0.7 | 0.5 | 0.5 | 0.5 | 0.3 | 0.3 |
| Total Aromatics | 80.9 | 77.5 | 78.4 | 77.9 | 78.5 | 74.9 |
| Total Olefins | 1.9 | 2.8 | | 2.0 | | 4.7 |
| Total Saturates | 17.2 | 19.7 | 21.6 | 20.1 | 21.5 | 20.4 |
| Sulfur, Wt. Percent | 0.25 | 0.26 | 0.22 | 0.45 | 0.02 | 0.73 |

By reference to Table I it is seen that at 200 p.s.i.g. the sulfur in the feed stock has been reduced to about one-third of that present in the feed stream, while, at the same time, the total aromatics content has been increased from 74.9% to 80.9%. At 500 p.s.i.g. the sulfur has been reduced to one-thirty-sixth of the feed sulfur. Each of these facets is valuable in the production of substantially sulfur-free aromatic hydrocarbon by improving both the total yield and product quality.

Figure 2:
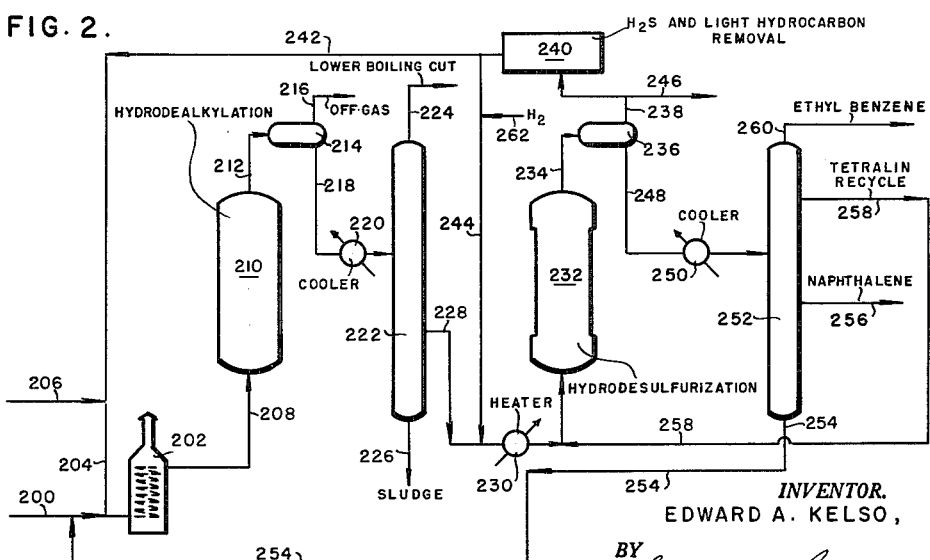
FIG. 2 is a schematic representation of the second aspect of the present invention, wherein hydrodesulfurization of the product of the hydrodealkylation reaction is utilized.

The second aspect of the present invention is set forth in FIG. 2 wherein a schematic diagram of a preferred mode shows that the hydrocarbon feed is introduced into the system by way of line 200, and is admixed with hydrogen in amounts of 1000 to 10,000 s.c.f. per barrel of liquid feed before introduction into the heater 202. The hydrogen is supplied by way of 204 from a source later to be discussed as well as by way of line 206, which represents fresh hydrogen feed. The admixed stream is heated in the heater 202 and raised to a temperature of about 1000 to 1100° F., which is sufficient to initiate the exothermic hydrodealkylation reaction. A portion of the heat added to the feed may be obtained by a feed-to-product heat exchanger (not shown) on the hydrodealkylation effluent stream. The heated feed stream is passed by way of line 208 into the hydrodealkylation reactor 210. The hydrodealkylated effluent from the reactor 210 is passed by way of line 212 into a flash drum 214 from whence the gaseous portion is removed by way of line 216 for recovery of the hydrocarbons present therein (by means not shown). The liquid stream from the flash drum 214 is withdrawn by way of line 218 and is cooled, if necessary, by exchanger 220 before preferably being introduced into a fractionating column 222. Within the fractionator 222 the hydrodealkylation product is separated preferably to remove an overhead stream which comprises hydrocarbons boiling at a temperature less than about the boiling point of naphthalene. A heavy sludge stream is withdrawn by way of line 226, which comprises polymer and other heavy hydrocarbons. A naphthalene-rich side stream is withdrawn by way of line 228 and is passed by way of heater 230 into the hydrodesulfurization reactor 232. Alternatively, the total liquid stream from drum 214 may be charged directly to the hydrodesulfurization reactor, but this would not permit the easy recovery of high purity ethyl benzene as set forth, infra.

The reactor 232 contains a hydrodesulfurization catalyst of the same type described in connection with the hydrodesulfurization reactor of the first aspect, although as is set forth more particularly hereinbelow, the conditions under which the hydrodesulfurization reaction is carried out differ from those utilized in the first aspect. The effluent from hydrodesulfurization reactor 232 is passed by way of line 234 into a flash drum 236, with the gaseous hydrogen-rich stream being passed from the flash drum 236 by way of line 238 into a hydrogen sulfide removal zone 240. This hydrogen sulfide removal may be accomplished by means well-known in the art, such as, for instance, a caustic wash, a di- or triethanol-amine treatment, or other equivalent treating operations. Light hydrocarbons are also removed from the gaseous stream; for example, in an absorption column.

The effluent from the hydrogen sulfide removal zone is a hydrogen-rich gas which is passed by way of line 240 or 242 either to the charge stream into the hydrodealkylation reactor by way of line 204 or into the charge stream to the hydrodesulfurization reactor by way of line 244. It is contemplated that a portion of the hydrogen-rich gas may be passed to each of the reactors. It is further contemplated that a portion of the recycle stream may be bled continuously or intermittently by way of line 246 in order to prevent a buildup of light gaseous hydrocarbons and a concomitant decrease in the hydrogen purity of the recycle stream.

The liquid product from the flash drum 236 is passed by way of line 248 through a cooler 250 and into a fractionator 252 wherein the liquid product is separated into a naphthalene precursor recycle stream which is removed from the bottom of the tower by way of line 254, into a naphthalene-rich product stream which is removed as a side cut by way of line 256 and into a tetralin recycle stream which is removed by way of line 258 as a side stream and is recycled into the hydrodesulfurization reactor. A stream which comprises substantially pure methyl benzene is withdrawn overhead by way of line 260.

In the continuous operation of the modification shown in FIG. 2, it may be necessary to introduce fresh hydrogen into the charge stream to the hydrodesulfurization unit, inasmuch as the hydrodealkylation process is a net consumer of hydrogen, and the recycle stream may at times be insufficient to provide adequate hydrogen for the hydrodesulfurization reactor. Therefore, means 262 are provided for introducing makeup hydrogen into the hydrogen recycle line 244.

In further explanation of the process as set forth in FIG. 2, it should be noted that by recycling the tetralin which is present in the hydrodesulfurization effluent, no net tetralin production will be suffered in the hydrodesulfurization reaction. The recycle stream will supply the tetralin necessary to establish equilibrium within the reactor, and no further hydrogenation of naphthalenes will take place. Thus, product losses to tetralin are avoided.

Another aspect of the process as set forth in FIG. 2 which should be pointed out constitutes the recovery of substantially pure ethyl benzene as an overhead product from the fractionator 252. This is accomplished by using a separation in fractionator 222 which discharges from the hydrodesulfurization feed all hydrocarbons having a boiling point greater than about that of naphthalene. Since the benzothiophene which is present in the effluent from the hydrodealkylation zone has a boiling point substantially that of naphthalene, it will be passed through the fractionator and will be desulfurized to ethyl benzene, which may then be recovered as a lower boiling component of the hydrodesulfurization zone effluent. Under normal conditions, the naphthalene feed will contain about 0.8% sulfur, which represents about 3.3% benzothiophene and is equivalent to about 3.5% ethyl benzene.

Expressed in terms of 1000 bbl./day naphthalene feed stream, this would result in the recovery of 35 bbl./day of extremely high purity ethyl benzene from the fractionator 252.

It is important in the carrying out of the invention, according to this aspect, that the hydrodesulfurization reaction be carried out under conditions which will minimize the hydrogenation of the naphthalene product to tetralin and/or decalin. Therefore, the conditions must be maintained within the range of about 600° F. to 1000° F. at 100 to 500 p.s.i.g. The hydrogen rate is 500 to 10,000 s.c.f. per barrel of liquid feed, and the space velocity is maintained at about 0.5 to 10 v./v./hr. The hydrogen stream is maintained at between 50 and 100% purity. Under the correct combination of hydrogen rate, temperature, and pressure, not more than 5% of the naphthalene is hydrogenated while the sulfur content in the naphthalene stream is reduced below 0.01 weight percent. In a consideration of the variables involved in the practice of this aspect, the amount of naphthalene hydrogenated to tetralin and decalin is an important function. As is shown by the tabulation below, where the pressure is raised to 500 pounds and the temperature maintained at 800° F., 12% of the naphthalene is hydrogenated to tetralin. Therefore, the temperature and pressure combinations within the broad range stated, along with the residence time or space velocity, must be chosen to minimize the formation of the tetralin. That is to say that at the higher pressures, a higher temperature must be used, while at the lower pressures, a lower temperature may be maintained. This is seen by reference to the table below wherein at 100 p.s.i.g. pressure and 800° F., only 0.6% of the naphthalene was hydrogenated to tetralin. The interrelationship between temperature and hydrogen partial pressure to minimize hydrogenation of naphthalene is controlled by the thermodynamic equilibrium in the naphthene-hydrogen-tetralin system.

TABLE II

*Desulfurization of dealkylation product*

Feed: 100 g. of naphthalene + 2 g. benzothiophene.
S=0.6 wt. percent.
Feed rate=1 v./v./hr.
H₂=500 s.c.f./hr.
Catalyst=1/16" Nalco CoMoO₃ on alumina.

PERCENT NAPHTHALENE HYDROGENATED TO TETRALIN

| Pressure, p.s.i.g. | 850° F. | 800° F. | 750° F. |
|---|---|---|---|
| 100 | | 0.6 | |
| 200 | 1.4 | 2.6 | 4.0 |
| 500 | | 12.0 | |

Sulfur content of all products <0.01 wt. percent.

By reference to the above table, it is also seen that at 200 pounds pressure at the elevated temperatures of 800° F. and 850° F., less than 3% of the naphthalene was reduced.

Figure 3:
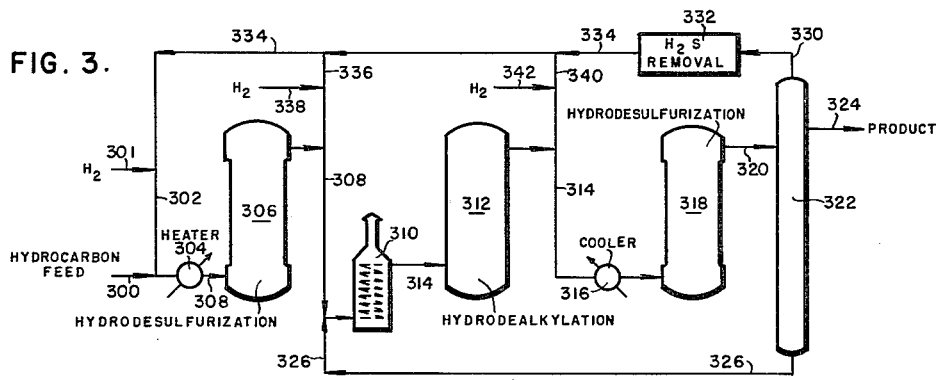
FIG. 3 is a representation of the combined process wherein both pretreatment of the feed and aftertreatment of the product are utilized.

The third aspect, or combination of the first two aspects, of this invention may be more fully understood by reference to FIG. 3 wherein the hydrocarbon feed is introduced by way of a line 300 and is admixed with hydrogen which is introduced by way of lines 301 and 302. The admixed stream is passed by way of a heater 304 and/or feed product heat exchanger (not shown) into a hydrodesulfurization reactor 306 by way of line 308. The hydrodesulfurization reactor contains the catalyst as above stated, and is operated under conditions similar to those of the reactor 108 in the first aspect. The effluent from reactor 306 is withdrawn by way of line 308 and is passed through a heater 310 into a hydrodealkylation reactor 312 by way of line 314. The hydrodealkylation reactor 312 is maintained under conditions as set forth in connection with the first two aspects. The effluent from the hydrodealkylation reactor is withdrawn by way of line 314 and is passed through cooler 316 into a second hydrodesulfurization reactor 318. The reactor 318 is maintained under conditions similar to those obtaining in hydrodesulfurization reactor 218 of the second aspect, and contains a catalyst similar thereto. The reactor effluent from the hydrodesulfurization reactor 318 is withdrawn by way of line 320 and is introduced into a fractionation column 322. A naphthalene product is withdrawn by way of line 324 and a heavy bottoms product is withdrawn by way of line 326. The bottoms product comprises the unreacted portion of the naphthalene precursors and is preferably recycled to the hydrodealkylation reactor by way of line 326 into line 308 immediately preceding the heater 310. As in the first and second aspects of this invention, the recycle stream may preferentially be taken as a lower vapor side stream from the fractionator and a heavy polymer removed as a bottoms product. An overhead gaseous stream is also removed by way of line 330 and is passed through a hydrogen sulfide removal zone similar to that of embodiments shown in FIGS. 1 and 2 and is passed by way of line 334 into admixture with the fresh hydrogen feed which is introduced by way of line 301 immediately preceding the first hydrodesulfurization reactor. A portion of the hydrogen-rich stream in line 334 may also be passed by way of lines 336 and 340 into admixture with the effluents from the hydrodesulfurization reactor and the hydrodealkylation reactor before admission into the hydrodealkylation and the second hydrodesulfurization zone. Fresh hydrogen may also be added at these points by way of lines 338 and 342. Although not shown, a bleed stream of recycle hydrogen will be removed in order to maintain hydrogen purity as discussed in the first two aspects of the invention. The tetralin recycle and prefractionation of the second hydrodesulfurization charge, as set forth in FIG. 2, may also be used in the combined process as set forth in FIG. 3. It should be seen by an inspection of FIG. 3 that a flexible system is provided wherein hydrodesulfurization of both the hydrocarbon feed to the hydrodealkylation unit and the effluent from the hydrodealkylation reactor may be treated, or either of the hydrodesulfurization reactors may be bypassed by means not shown.

The liquid product from all three aspects of this invention may be routed to conventional fractionation systems to separate out a benzene and heavier alkyl benzene products and naphthalene. Ultimately pure benzene, toluene, xylenes, tetralin and naphthalene may be produced by conventional distillation and clay-treating techniques.

The inventor, having disclosed in detail the essence of the present invention and having shown preferred embodiments and set forth the best mode of the practice thereof, desires that the scope of the present invention be determined not by the specific examples given, but rather only by the scope of the appended claim.

I claim:

A method which comprises admixing a hydrocarbon stream containing alkylated precursors of naphthalene with a hydrogen-rich gaseous stream, heating the admixed stream to a temperature sufficient to initiate a thermal hydrodealkylation reaction, passing said heated stream through a catalyst-free hydrodealkylation zone under hydrodealkylation conditions including a temperature of 1000° F. to 1600° F., a pressure of 500 p.s.i.g. to 1500 p.s.i.g., a hydrogen to hydrocarbon mol ratio of 0.6 to 12 mols of hydrogen per mol of hydrocarbon feed, and a residence time of 2 to 120 seconds, removing the reaction products from said zone, cooling said products to a hydrodesulfurization temperature, passing said cooled products through a hydrodesulfurization zone under hydrodesulfurization conditions including a temperature of 600° F. to 1000° F., a pressure of 100 to 200 p.s.i.g., a space velocity of 0.5 to 10.0 volumes of feed per volume of catalyst per hour, and a hydrogen feed rate of 500 to 10,000 s.c.f. of hydrogen per barrel of hydrocarbon feed and in contact with a hydrodesulfurization catalyst chosen from the metals of Groups VI and VIII of the Periodic Chart and the compounds thereof, removing the stream as an effluent from said hydrodesufurization zone, separating said effluent into a naphthalene-rich fraction, a heavy unconverted and partially converted alkyl naphthalene precursor fraction, a tetralin fraction and a gaseous light fraction, recycling said tetralin fraction to said hydrodesulfurization zone, and recovering substantially sulfur-free naphthalene from said effluent.

References Cited by the Examiner

UNITED STATES PATENTS

| 2,577,788 | 12/51 | McAteer et al. | 260—668 |
|---|---|---|---|
| 2,674,635 | 4/54 | Beckberger | 260—672 |
| 2,759,899 | 8/56 | Hanson | 208—216 |
| 2,774,718 | 12/56 | Johnson et al. | 208—216 |
| 2,799,661 | 7/57 | De Rosset | 208—216 |
| 2,883,441 | 4/59 | Sawyer | 260—672 |
| 3,001,932 | 9/61 | Pietsch | 208—212 |
| 3,102,151 | 8/63 | Haldeman et al. | 260—672 |

ALPHONSO D. SULLIVAN, *Primary Examiner.*

MILTON STERMAN, JOSEPH R. LIBERMAN, *Examiners.*